(12) United States Patent
Wildes et al.

(10) Patent No.: US 6,775,339 B1
(45) Date of Patent: Aug. 10, 2004

(54) CIRCUIT DESIGN FOR HIGH-SPEED DIGITAL COMMUNICATION

(75) Inventors: Paul T. Wildes, Eau Claire, WI (US); Mark S. Birrittella, Chippewa Falls, WI (US)

(73) Assignee: Silicon Graphics, Inc., Mountain View, CA (US)

( * ) Notice: Subject to any disclaimer, the term of this patent is extended or adjusted under 35 U.S.C. 154(b) by 0 days.

(21) Appl. No.: 09/384,906

(22) Filed: Aug. 27, 1999

(51) Int. Cl.[7] ............................. H04L 7/00; H04L 7/04
(52) U.S. Cl. ..................................................... 375/354
(58) Field of Search ........................ 375/354, 377, 375/359, 362, 219, 220, 244, 259, 355, 356; 370/350, 503; 713/400, 401, 503; 711/5, 163; 327/141, 144, 145

(56) References Cited

U.S. PATENT DOCUMENTS

| | | | |
|---|---|---|---|
| 4,477,713 A | 10/1984 | Cook et al. ............. | 219/124.34 |
| 4,514,749 A | 4/1985 | Shoji ........................... | 357/68 |
| 4,587,445 A | 5/1986 | Kanuma ..................... | 307/443 |
| 4,823,184 A | 4/1989 | Belmares-Sarabia et al. . | 358/27 |
| 4,926,066 A | 5/1990 | Maini et al. ................ | 307/303 |
| 5,144,174 A | 9/1992 | Murakami ................... | 307/608 |
| 5,295,132 A | 3/1994 | Hashimoto et al. ........... | 370/13 |
| 5,315,175 A | 5/1994 | Langner ..................... | 307/443 |
| 5,416,606 A | 5/1995 | Katayama et al. .......... | 358/467 |
| 5,481,567 A | 1/1996 | Betts et al. ................. | 375/261 |
| 5,521,836 A | 5/1996 | Hartong et al. ............. | 364/491 |
| 5,535,223 A | 7/1996 | Horstmann et al. .......... | 371/27 |
| 5,537,068 A | 7/1996 | Konno ....................... | 327/115 |
| 5,544,203 A | 8/1996 | Casasanta et al. .......... | 375/376 |
| 5,555,188 A | 9/1996 | Chakradhar ................. | 364/490 |
| 5,579,336 A | 11/1996 | Fitzgerald et al. .......... | 375/219 |
| 5,583,454 A | 12/1996 | Hawkins et al. ............. | 326/81 |
| 5,604,450 A | 2/1997 | Borkar et al. ................ | 326/82 |

(List continued on next page.)

OTHER PUBLICATIONS

Lee, K., et al., "A CMOS Serial Link for 1 Gbaud Fully Duplexed Data Communication", *Symposium on VLSI Circuits, US, NY IEEE, XP000501054*, 125–126, (Jun. 9, 1994).

(List continued on next page.)

*Primary Examiner*—Emmanuel Bayard
*Assistant Examiner*—Dung X. Nguyen
(74) *Attorney, Agent, or Firm*—Schwegman, Lundberg, Woessner & Kluth, P.A.

(57) ABSTRACT

The present invention provides a system for efficient, high speed, high bandwidth, digital communication where transmit distances are greater than a single clock period. The digital system operates based on a system clock. Within the digital system a transmit module transmits data along with a capture clock signal to a receive module where the transmission time between the modules is greater than one period of the system clock. The capture clock operates in a known relationship to the system clock at a frequency at least twice as slow as the system clock. The digital system also has a synchronizing clock that operates at the same frequency as the forwarded clock. When the data arrives at the receive module it is captured by a pair of memory devices operating on different phases of the capture clock. The memory devices feed the data to a multiplexor that selects, as a function of the synchronizing clock, between the outputs of the two memory devices. At this point the data has been synchronized with the system clock and can be captured using the system clock for processing in the receive module.

19 Claims, 9 Drawing Sheets

U.S. PATENT DOCUMENTS

| | | | | |
|---|---|---|---|---|
| 5,621,774 A | | 4/1997 | Ishibashi et al. | 375/371 |
| 5,657,346 A | | 8/1997 | Lordi et al. | 375/224 |
| 5,757,658 A | | 5/1998 | Rodman et al. | 364/491 |
| 5,778,214 A | | 7/1998 | Taya et al. | 395/551 |
| 5,778,308 A | | 7/1998 | Sroka et al. | 455/115 |
| 5,787,268 A | | 7/1998 | Sugiyama et al. | 395/500 |
| 5,790,838 A | | 8/1998 | Irish et al. | 395/555 |
| 5,793,259 A | | 8/1998 | Chengson | 331/78 |
| 5,802,103 A | | 9/1998 | Jeong | 375/220 |
| 5,811,997 A | | 9/1998 | Chengson et al. | 327/112 |
| 5,828,833 A | | 10/1998 | Belville et al. | 395/187.01 |
| 5,844,954 A | | 12/1998 | Casasanta et al. | 375/373 |
| 5,847,592 A | | 12/1998 | Gleim et al. | 327/403 |
| 5,870,340 A | | 2/1999 | Ohsawa | 365/189.02 |
| 5,872,471 A | | 2/1999 | Ishibashi et al. | 327/98 |
| 5,898,729 A | | 4/1999 | Boezen et al. | 375/259 |
| 5,910,898 A | | 6/1999 | Johannsen | 364/489 |
| 5,915,104 A | | 6/1999 | Miller | 395/309 |
| 5,920,213 A | | 7/1999 | Graf, III | 327/144 |
| 5,922,076 A | | 7/1999 | Garde | 713/600 |
| 5,948,083 A | | 9/1999 | Gervasi | 710/62 |
| 5,982,309 A | | 11/1999 | Xi et al. | 341/101 |
| 6,005,895 A | | 12/1999 | Perino et al. | 375/288 |
| 6,016,553 A | | 1/2000 | Schneider et al. | 714/21 |
| 6,029,250 A | * | 2/2000 | Keeth | 713/400 |
| 6,084,930 A | * | 7/2000 | Dinteman | 375/354 |
| 6,100,735 A | | 8/2000 | Lu | 327/158 |
| 6,104,223 A | | 8/2000 | Chapman et al. | 327/276 |
| 6,104,228 A | | 8/2000 | Lakshmikumar | 327/407 |
| 6,127,872 A | | 10/2000 | Kumata | 327/276 |
| 6,150,875 A | | 11/2000 | Tsinker | 327/552 |
| 6,175,589 B1 | | 1/2001 | Yu et al. | 375/257 |
| 6,178,206 B1 | * | 1/2001 | Kelly et al. | 375/257 |
| 6,229,358 B1 | | 5/2001 | Boerstler et al. | 327/116 |
| 6,232,946 B1 | | 5/2001 | Brownlow et al. | 345/98 |
| 6,286,841 B1 | | 7/2001 | Cairns et al. | 345/98 |
| 6,294,924 B1 | | 9/2001 | Ang et al. | 326/30 |
| 6,294,937 B1 | | 9/2001 | Crafts et al. | 327/158 |
| 6,334,163 B1 | * | 12/2001 | Dreps et al. | 710/129 |
| 6,380,878 B1 | | 4/2002 | Pinna | 341/154 |
| 6,417,713 B1 | | 7/2002 | DeRyckere et al. | 327/271 |
| 6,430,242 B1 | * | 8/2002 | Buchanan et al. | 375/371 |

OTHER PUBLICATIONS

"The SA27 library includes programmable delay elements Delaymuxo and Delaymuxn. How are these cells used?", *IBM Delaymuxn Book*, pp. 1–6, (Feb. 1999)

"Low Power Quad Differential Line Driver with Cut–Off", *National Semiconductor, F100K ECL 300 Series Databook and Design Guide, pp. 2–54–2–60*, (1992).

Djordjevic, A.R., et al., "Time Domain Response of Multi-conductor Transmission Lines", *Proceedings of the IEEE*, 75(6), 743–64, (Jun. 1987).

Im, G., et al., "Bandwidth–Efficient Digital Transmission over Unshielded Twisted–Pair Wiring", *IEEE Journal on Selected Areas in Communications*, 13(9), 1643–1655, (Dec. 1995).

Mooney, R., et al., "A 900 Mb/s Bidirectional Signaling Scheme", *IEEE Journal of Solid–State Circuits*, 30(12), 1538–1543, (Dec. 1995).

Takahashi, T., et al., "110GB/s Simultaneous Bi–Directional Transceiver Logic Synchronized with a System Clock", *IEEE International Solid–State Circuits Conference*, 176–177, (1999).

*Lattice Semiconductor Corporation*, htt://www.latticesemi-.com, (2002), 7 pgs.

\* cited by examiner

CIRCUIT DESIGN FOR HIGH-SPEED DIGITAL COMMUNICATION

BACKGROUND OF THE INVENTION

1. Field of the Invention

The present invention is related to electronic and computer system communications, and more particularly to an apparatus and method for high speed digital communication.

2. Background Information

In the electronic circuit and computer industries the current trend is toward designing and building systems which operate at ever increasing clock speeds. In addition, there is wide-spread use of multiple integrated circuits in these systems, all of which are interconnected to achieve greater processing power and promote efficiency. As clock speeds continue to increase, the time to transfer data between interconnected integrated circuits has surpassed a single clock period.

An interconnect path greater than a single clock period is called a multiple-clock path. It is called a multiple-clock path because the communication route between one circuit and another is long enough that it takes multiple-clock periods for transmitted information to arrive at a receive circuit. These multiple-clock paths introduce a number of difficulties into system design, all related to handling the transmitted data at a receiving circuit.

A first method used to allow multiple-clock paths in a system is a synchronous design where the multiple integrated circuits operate from the same clock. While this type of solution allows for multiple-clock period paths it introduces difficult short-path issues that violate hold times for the receiving circuits. These problems require minimum distances between integrated circuits, extra padding in the interconnects, or additional integrated circuit logic.

Another attempted solution for the multiple-clock path problem is a complex source-synchronous channel protocol. Here, a complex forwarded clock scheme is used where the timing between the forwarded clock and the receiving chip clock is not known. This solution requires a data verification and resynchronization sequence at the receiving circuit. This complex source-synchronous channel protocol significantly increases latency in the channel while adding significant levels of design complexity in the receiving circuit.

Thus, there is a need for a method and apparatus for high speed digital communication that allows for high-bandwidth, low-latency communication where the transmit time between circuits is greater than a single period of the system clock. Additionally, the system needs to guarantee data integrity by meeting the minimum and maximum timing constraints of the receive circuits without adding excess design complexity.

SUMMARY OF THE INVENTION

The present invention provides a system and method for efficient high speed, high bandwidth, digital communication where transmit distances are greater than a single clock period. The system and method operate utilizing a synchronized design that takes advantage of a forwarded clock and pairs of memory devices to quickly latch data into a receiving circuit without violating timing constraints. A multiplexor is then used to allow the data to be available almost immediately for processing in the receiving circuit without any corruption of data, even when operating at very high speeds. Additionally, the system, since it uses a minimum amount of circuitry, avoids complexity while reducing the latency of transmitted data.

According to one aspect of the present invention, a digital system operates based on a system clock. Within the digital system a transmit module transmits data along with a capture clock signal to a receive module where the transmission time between the modules is greater than one period of the system clock. The capture clock operates in a known relationship to the system clock at a frequency at least twice as slow as the system clock. The digital system also has a synchronizing clock that operates at the same frequency as the forwarded clock. When the data arrives at the receive module it is captured by a pair of memory devices operating on different phases of the capture clock. The memory devices feed the data to a multiplexor that selects, as a function of the synchronizing clock, between the outputs of the two memory devices. At this point the data has been synchronized with the system clock and can be captured using the system clock for processing in the receive module.

According to another aspect of the present invention, an integrated circuit is operated using a system clock. The integrated circuit also has a capture clock that operates in a known relationship to the system clock at a frequency at least twice as slow as the system clock and a synchronizing clock that operates at the same frequency as the capture clock. Within the integrated circuit there is a transmit subcircuit that has a transmit memory device and an output for the capture clock. Connected to the transmit subcircuit is a receive subcircuit. The receive subcircuit has a first memory device connected to the transit memory device and operates on a first phase of the capture clock. The receive subcircuit also has a second memory device connected to the transmit memory device and operates on a second phase of the capture clock. The receive subcircuit then has a multiplexor having one input connected to the output of the first memory device and a second input connected to the output of the second memory device and an output select node that is connected to the synchronizing clock. The output of the multiplexor is connected to an input memory device that is operated on the system clock.

Yet another aspect of the present invention is a system operated at a first clock frequency that has a receive module having a pair of memory devices. The system generates both a forwarded clock that operates at a frequency at least twice as slow as the first clock and a receive clock that operates at the same frequency as the forwarded clock. The system then transmits data and the forwarded clock from a transmit module to the receive module. The receive module stores the transmitted data into a pair of memory devices, each memory device operating on a different phase of the forwarded clock. The data out of the pair of memory devices is first synchronized with the receive module using the receive clock and then captured for further processing using the first clock.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
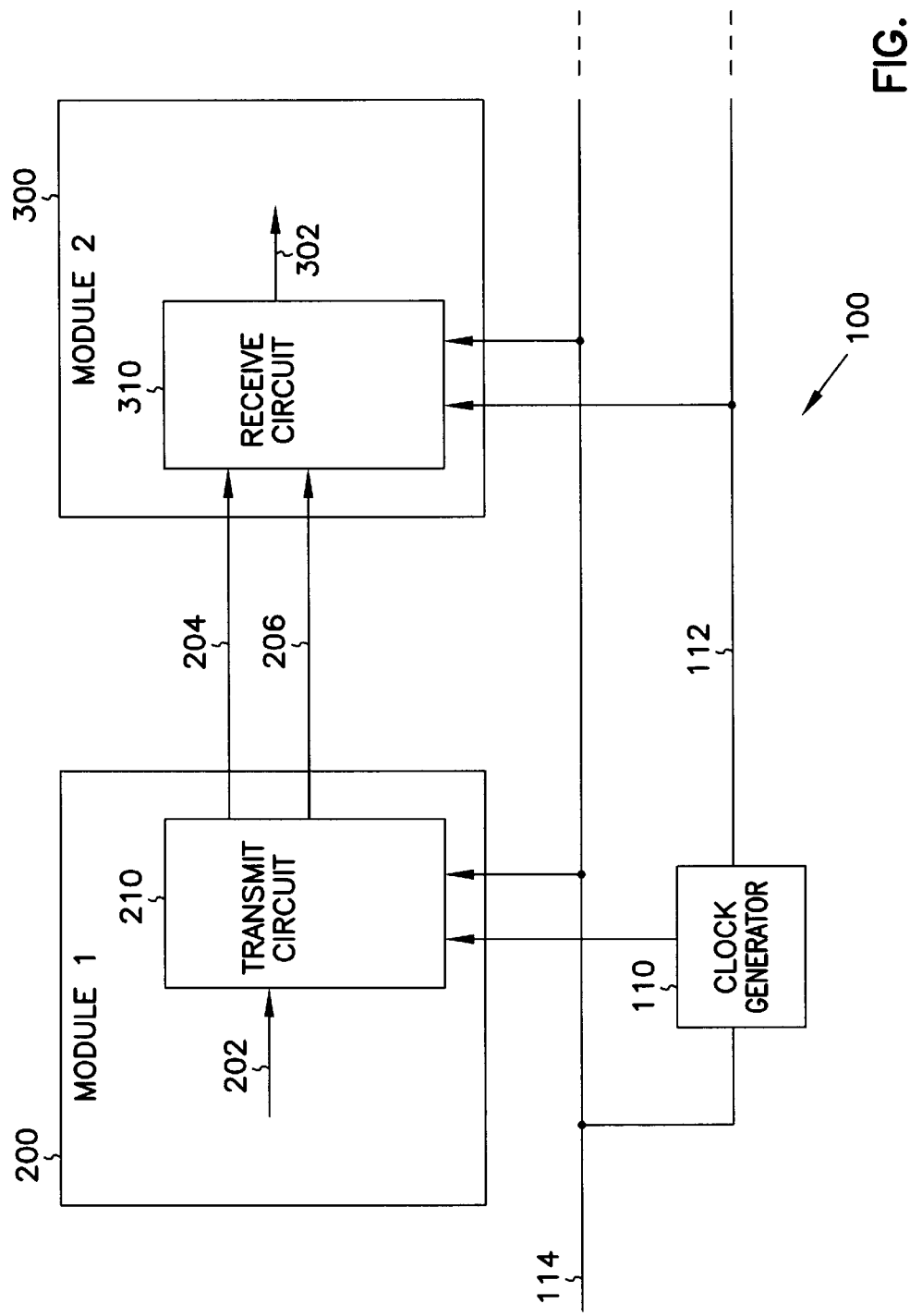
FIG. 1 is a block diagram of functional modules used in one embodiment of the present invention.

FIG. 1 shows one embodiment of the present invention as a system for synchronous communication 100. This system has a transmit module 200 which has a transmit circuit 210 with a data output node 204 and a capture clock output 206, a receive module 300 with inputs connected to the data output node 204 of the transmit circuit 210 and the capture clock output 206, a system clock 114, a synchronizing clock generator 110 outside of the transmit 200 and receive 300 modules, and a synchronizing clock 112.

The synchronous system 100 of FIG. 1 operates by generating a synchronizing clock 112 from the system clock 114 using a clock generating circuit 110, where the synchronizing clock 112 operates at a frequency at least two times slower than the system clock 114. The synchronizing clock 112 is also delayed with respect to the system clock 114 by a known amount, which in one embodiment is less than one period of the system clock 114. The two clocks 112 and 114 are then used to drive the transmit module 200 and the receive module 300. The transmit module 200 feeds data 202 into the transmit circuit 210 which captures the data 202 and transmits it out the data output node 204, along with the capture clock 206, to the receive module 300. After a period of time, the transmitted data on the data output node 204 and capture clock 206 will arrive at the receive module 300. The receive module then uses the receive circuit 310 to synchronize the data on the data output node 204 with the system clock 112 in the receive module 300 using the capture clock 206, the synchronizing clock 112 and the system clock 114. The synchronized data 302 is then fed into the receive module. In one embodiment the period of time will be greater than one period of the system clock 114.

Figure 2:
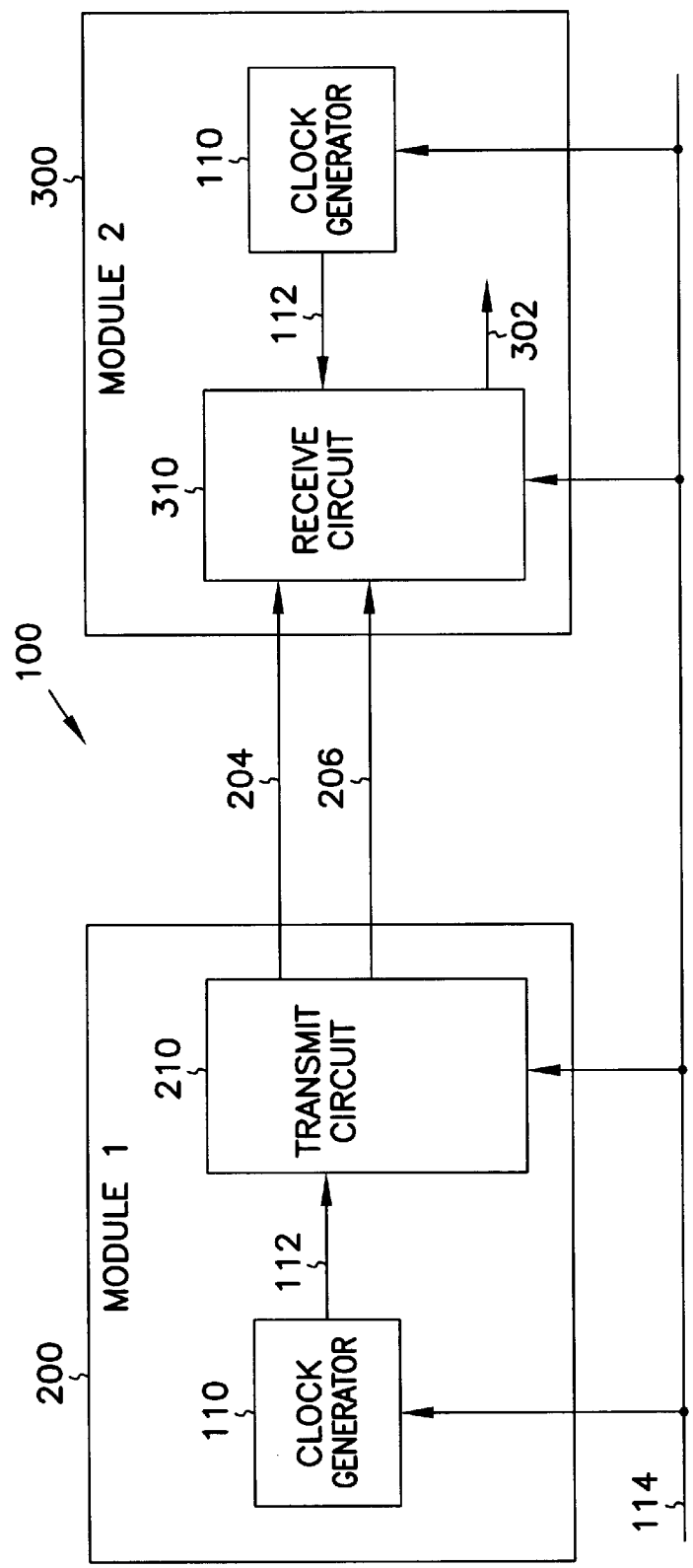
FIG. 2 is another block diagram of functional modules used in one embodiment of the present invention.

FIG. 2 shows another embodiment of the synchronous system 100 where the synchronizing clock generator 110 is now included in the transmit 200 and receive 300 modules instead of outside of either module. The operation of the system in FIG. 2 is similar to that of FIG. 1 except the synchronizing clock 112 is now generated in each module. The synchronizing clock 112 still maintains an operating frequency at least two times slower than the system clock 114 and is delayed with respect to the system clock 114, where the delay in one embodiment is less than one clock period of the system clock 114.

Figure 3:
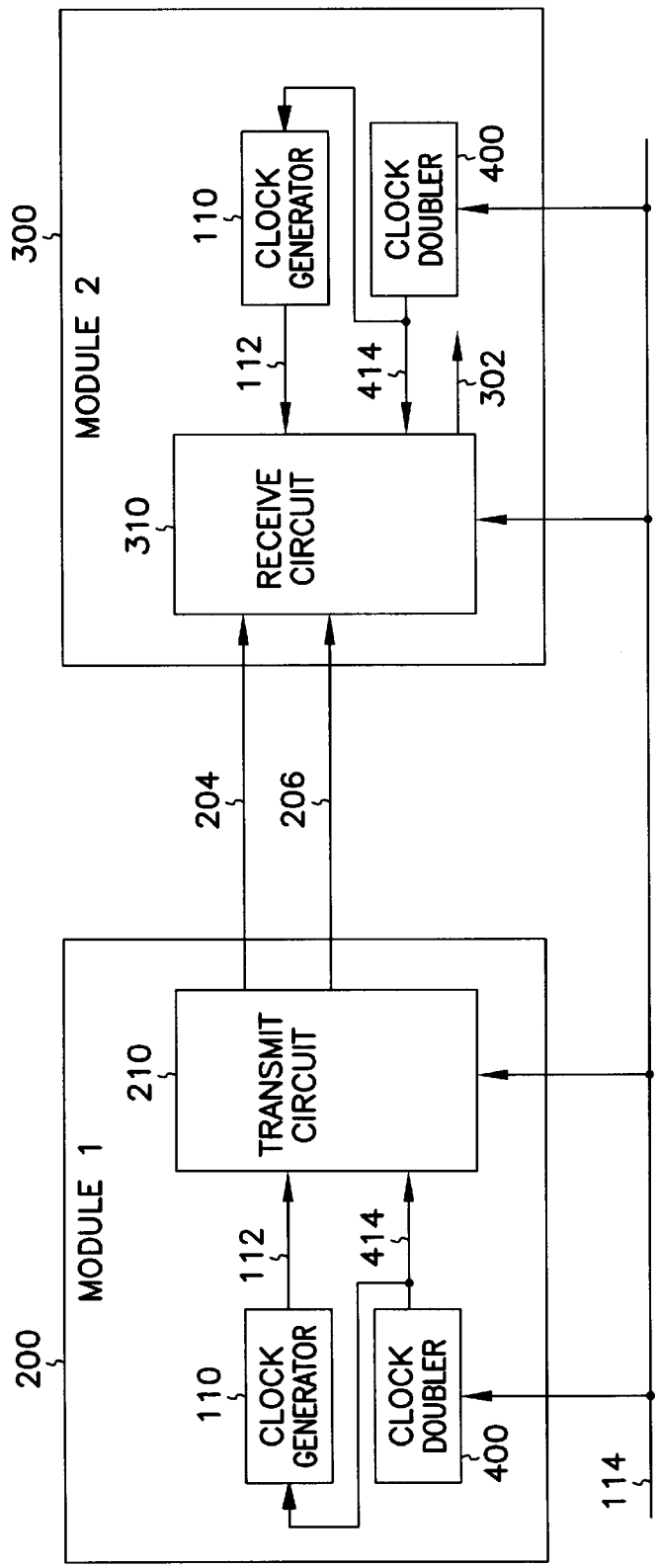
FIG. 3 is another block diagram of functional modules used in one embodiment of the present invention.

FIG. 3 shows another embodiment of the synchronous system 100 where the system clock 114 is global and both the transmit module 200 and the receive module 300 modify the system clock 114 as it enters each module to create an internal system clock 414 which operates each module at a different internal speed. In one embodiment this speed change makes the internal system clock 414 twice as fast as the system clock 114. This new internal system clock 414 is then used to generate the synchronizing clock 112. The synchronizing clock 112 operates at a frequency at least two times slower than the system clock 414. The synchronizing clock 112 is also delayed with respect to the system clock 414 by a known amount, which in one embodiment is less than one period of the system clock 414. In all other ways the synchronous system 100 of FIG. 3 operates the same as that of FIG. 2 described above.

Figure 4:
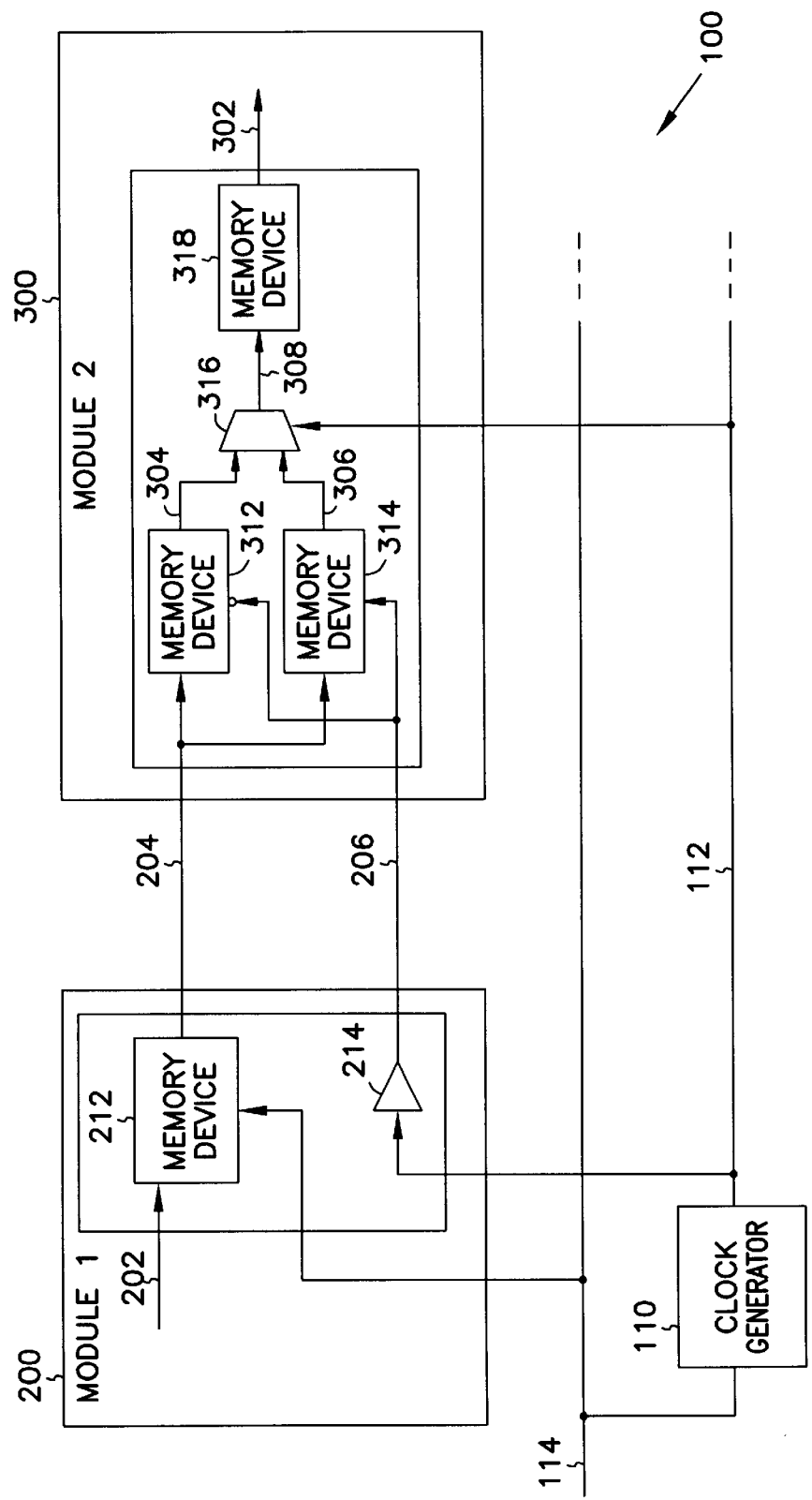
FIG. 4 is a component level diagram of a system used in one embodiment of the present invention.

FIG. 4 shows another embodiment of the synchronous system 100 where the detail involved in the transmit 210 and receive 310 circuits is shown. In this embodiment there is a system clock 114, a synchronizing clock 112, a synchronizing clock generator 110, a transmit module 200, and a receive module 300. The transmit module 200 contains a transmit circuit 210 comprising a memory device 212 for transmitting transmit module data 202 through the data output node 204, and a delay circuit 214 for transmitting the synchronizing clock 112 as the capture clock 206. In other embodiments the memory device 212 is not limited to a single device and may be replaced with one or more memory devices for transmitting multiple lines of data. The receive module 300 contains a receive circuit 310 which comprises a pair of memory devices 312 and 314 operating on different phases of the capture clock 206, with outputs 304 and 306 connected to the inputs of multiplexor 316, which is operated by the synchronizing clock 112, and a memory device 318 with its input connected to the output 308 of multiplexor 316. In one such embodiment the receive module 300 may have multiple receive circuits 310, including one receive circuit for each line of data from the transmit module 200. In other such embodiments the memory devices 212, 314 and 318 are positive triggered D latches and the memory device 312 is a negative triggered D latch. In another embodiment the memory devices 212, 314 and 318 are positive edge triggered D flip-flops and the memory device 312 is a negative edge triggered D flip-flops. Also, in one embodiment the transmit module 200 and receive module 300 are integrated circuits.

The synchronous system of FIG. 4 operates by the transmit module 200 providing data 202 to the transmit circuit 210. The transmit circuit 210 captures the data 202 using memory device 212 which is operating based on the system clock 114. The transmit circuit 210 then transmits the captured data on the data output node 204. At the same time, the transmit circuit 210 transmits the synchronizing clock 112, delayed with the delay circuit 214 to match the data on the output data node 204, as the capture clock 206. After a period of time, the data on the data output node 204 arrives at the receive module 300 and is captured by the receive circuit 310 using the capture clock 206 to store the data in each of the pair of memory devices 312 and 314. In one embodiment, the period of time is greater than one clock period of the system clock 114. The multiplexor 316 then selects between the memory device outputs 304 and 306 as a function of the synchronizing clock 112, synchronizing the data with the system clock. The synchronized data at the output of the multiplexor 308 is then captured by memory device 318 operating on the system clock 114 and is output into the receive module 300 on output node 302. The output data on output node 302 is now properly synchronized into the receive module. In other embodiments there are multiple lines of data 202 coming from the transmit module 200; each additional line is treated in the same way as those described above.

Figure 5:
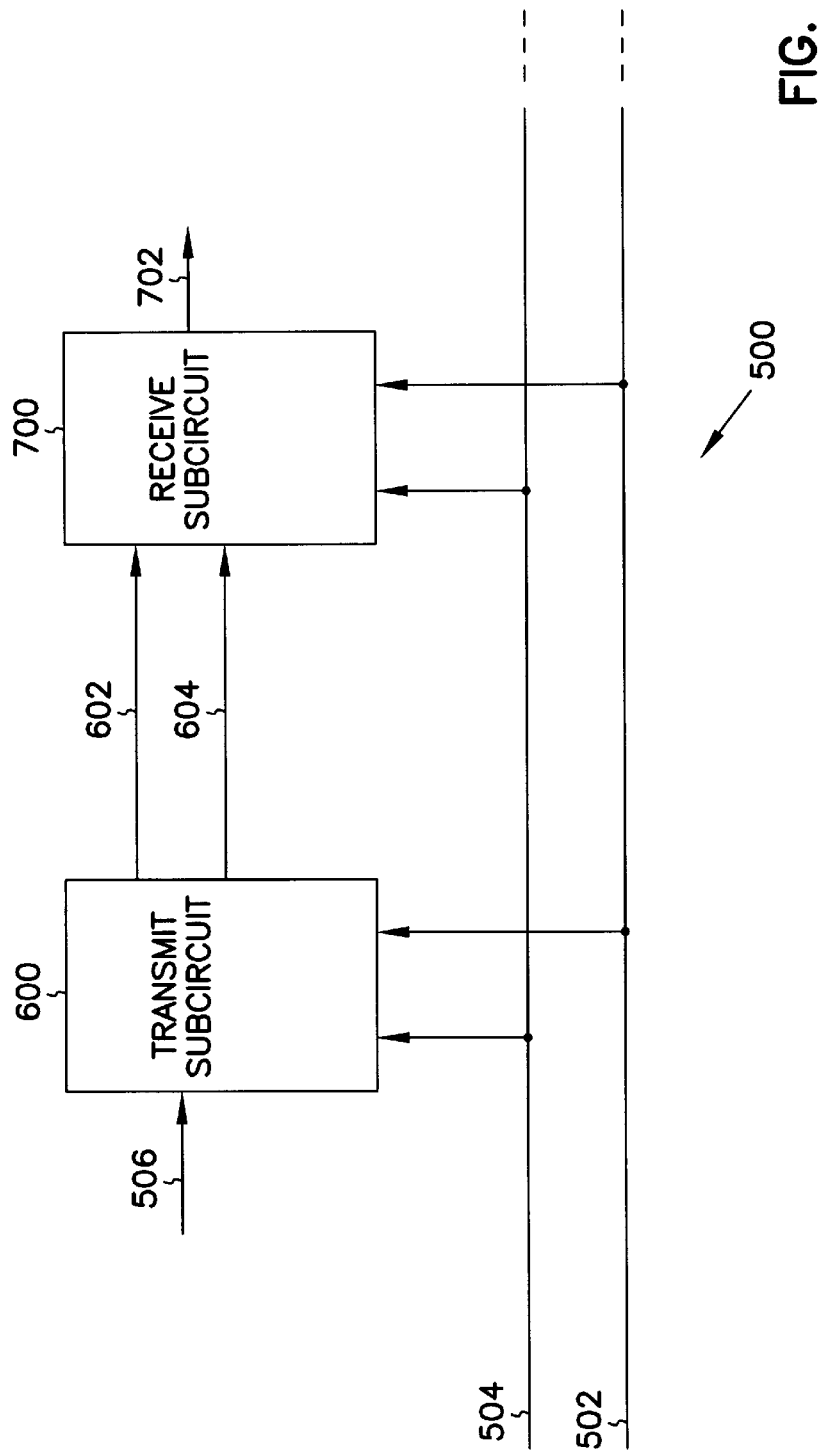
FIG. 5 is a block diagram of an integrated circuit used in one embodiment of the present invention.

FIG. 5 shows another embodiment of the present invention as a synchronous communication integrated circuit 500. The integrated circuit 500 includes a system clock 504, a synchronizing clock 502, a transmit subcircuit 600 having a data input node 506, a data output node 602 and an output for the capture clock 604, and a receive subcircuit 700 having inputs connected to the data output node 602 and the capture clock 604, and synchronized data output node 702. In another embodiment, there may be multiple data input nodes 506 and correspondingly, multiple data output nodes 602 and multiple synchronized data input nodes 702.

The integrated circuit 500 of FIG. 5 operates by the transmit subcircuit 600 capturing data from the data input node 506 using the system clock 504 and transmitting the data on the data output node 602, along with the synchronizing clock 502 as the capture clock 604, to the receive subcircuit 700. After a period of time, the data on the data output node 602 and the capture clock will arrive at the receive subcircuit 700, where the incoming data on the data output node 602 is synchronized to the system clock 504 using the capture clock 604, the synchronizing clock 502 and the system clock 504. In one embodiment the period of time is greater than one period of the system clock 504. The synchronized data is then output on the synchronized data output node 702.

Figure 6:
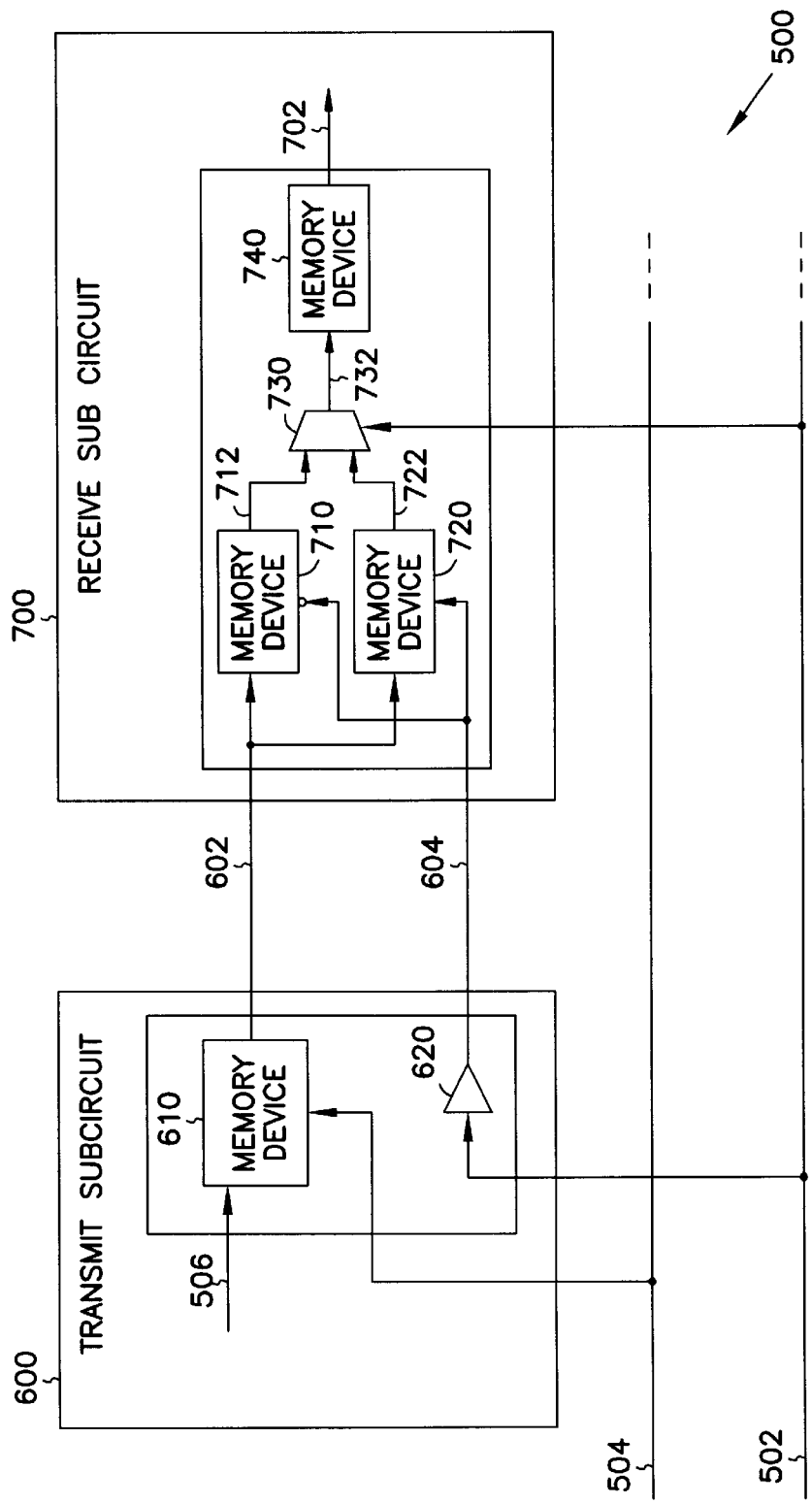
FIG. 6 is a component level diagram of an integrated circuit used in one embodiment of the present invention.

FIG. 6 shows another embodiment of the present invention as an integrated circuit 500 for synchronous communication. The integrated circuit 500 has a system clock 504, a synchronizing clock 502, a data input 506, a transmit subcircuit 600 which has a memory device 610 and a delay device 620, a data output 602, a capture clock 604, and a receive subcircuit 700 which has a pair of input memory devices 710 and 720, a multiplexor 730, and an output memory device 740.

The integrated circuit 500 of FIG. 6 operates in the following manner. Using the system clock 504, the memory device 610 in the transmit subcircuit 600 captures the data input 506 and transmits it as the data output 602 along with the capture clock 604, where the capture clock is generated by delaying the synchronizing clock 502 with delay device 620, to the receive subcircuit 700. After a period of time, the data output 602 and capture clock 604 arrives at the receive subcircuit 700. In one embodiment the period of time is greater than one period of the system clock 504. The receive subcircuit 700 captures the data output 602 using both memory devices 710 and 720 which operate on different phases of the capture clock 604. The multiplexor 730 then selects between the outputs of the two memory devices 712 and 722, as a function of the synchronizing clock 502, to synchronize the data for later processing as a function of the system clock 504. The output of the multiplexor 732 is then synchronized to the system clock 504 using the output memory device 740, thereby making the data available on data output 702 for additional processing using the system clock 504.

Figure 7:
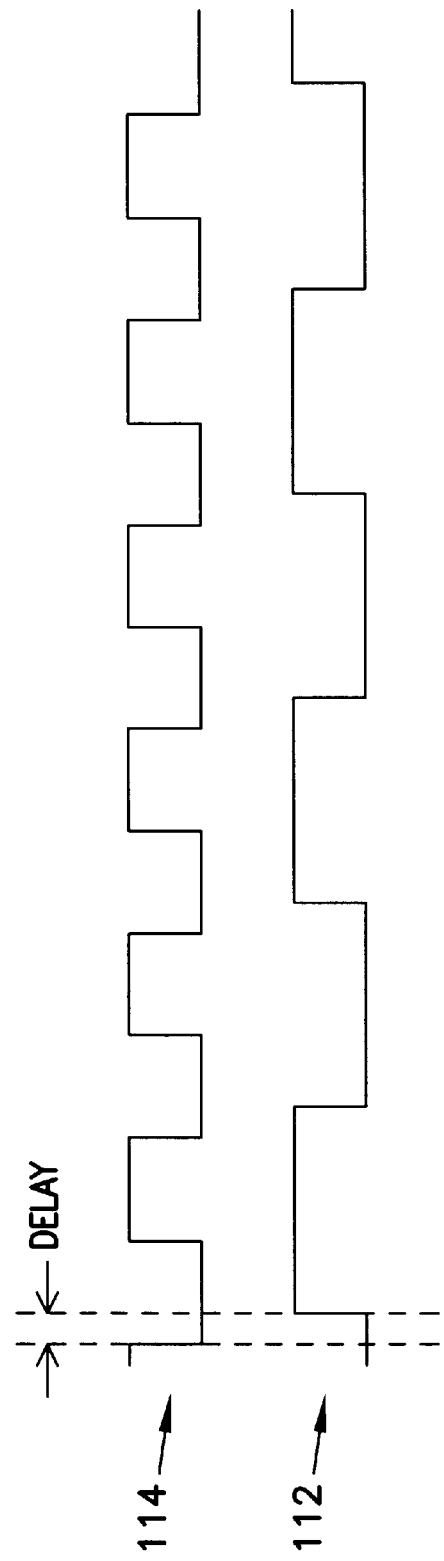
FIG. 7 is a diagram of the timing relationship of the system clock to the synchronizing clock for the system as depicted in FIGS. 1, 2 and 3.

Shown in FIG. 7 is a diagram of one embodiment of the relationship of the synchronizing clock 112 to the system clock 114. The delay between the two clocks is shown and is less than one period of the system clock 114. In other embodiments the delay maybe greater or less than that shown. The synchronizing clock 112 is also shown as having its frequency exactly twice as slow as the frequency of the system clock 114. In other embodiments the synchronizing clock 112 may be at some other frequency that is at least twice as slow as the system clock 114.

Figure 8:
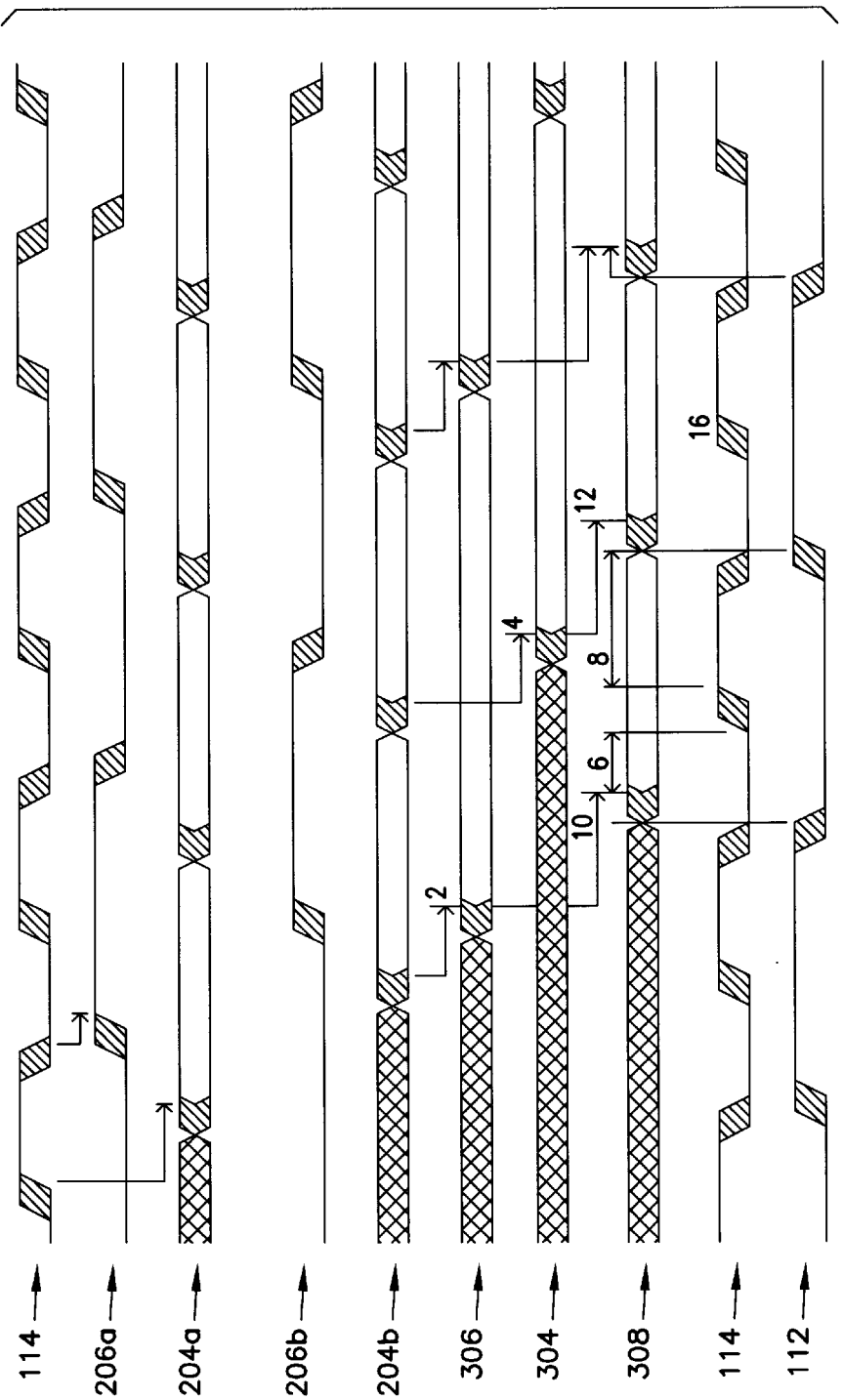
FIG. 8 is a timing diagram depicting the operation of one embodiment of the present invention.

In may be useful in understanding the present invention to study the timing diagrams for one embodiment of the present invention as shown in FIG. 8. The timing diagram contains a number of signals including: system clock 114, synchronizing clock 112, transmit capture clock 206a, receive capture clock 206b, transmit data 204a, receive data 204b, first captured data 306, second captured data 304 and merged data 308. Transmit data 204a is transmitted on the rising edge of the system clock 114. The transmit capture clock 206a is sent along with the transmit data 204a. After a period of time the transmit data 204a and transmit capture clock 206a become the receive data 204b and receive capture clock 206b. The receive data 204b is latched in on the rising edge of receive capture clock 206b at point 2 and becomes first captured data 306. The multiplexor 316 then passes the first capture data 306 to its output 308 at point 10 while the synchronizing clock 112 is low. Output 308 is held for the setup time 6 and hold time 8 required for memory device 318. Memory device 318 then latches the first capture data 306 on the rising edge of the system clock 114 at point 14. Next, the receive data 204b is latched on the falling edge of the receive capture clock 206b at point 4 and becomes second captured data 304. Multiplexor 316 then passes the second capture data 304 to its output 308 at point 12 while the synchronizing clock 112 is high. Last, memory device 318 latches the second capture data 304 on the rising edge of the system clock 114 at point 16. At this point two sets of data have been transmitted and received and are ready for processing, each piece of data is ready after only one system clock cycle has passed after arriving.

Figure 9:
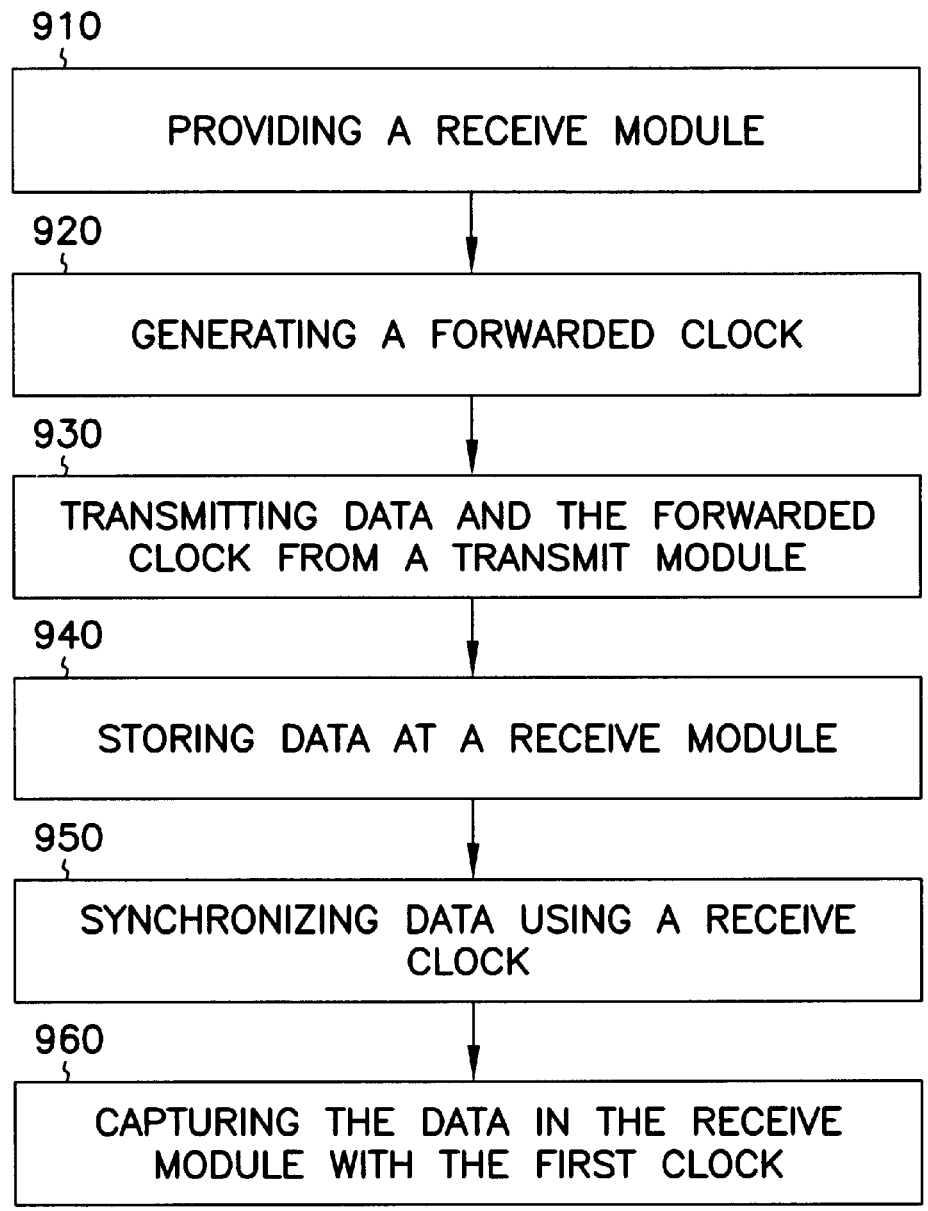
FIG. 9 is a flowchart depicting the steps followed in one embodiment to achieve high speed digital communication when the communication distance is greater than a single clock period.

Another embodiment of the present invention is detailed in FIG. 9 and is a method to transmit data from one module to another in a high speed synchronous system operating at a system clock frequency. In this method a receive module containing two memory devices is provided. In one embodiment, the memory devices are D latches. In another embodiment, the memory devices are edge triggered D flip-flops. A forwarded clock is generated with a first and second phase. The forwarded clock is a function of the system clock, and in one embodiment operates at a frequency at least twice as slow as the system clock frequency. A receive clock is generated which operates at a frequency equal to the forwarded clock. In one embodiment, the receive clock is delayed with respect to the system clock, and in another embodiment the delay is less than the one period of the system clock. A transmit module transmits data along with the forwarded clock to the receive module. After a period of time, the data and forwarded clock arrive at the receive module. In one embodiment, the period of time is greater than one period of the system clock. The receive module stores the data. Storing the data involves storing the data into a first memory device on the first phase of the forwarded clock and into a second memory device on the second phase of the forwarded clock. The data is then synchronized into the receive module using the receive clock. Finally, the synchronized data is captured in the receive module for further processing using the system clock.

In another embodiment of the present invention, a clock generator means is used to generate a system clock. Another clock generator means is used to generate a forwarded clock based on the system clock, where the forwarded clock operates at a frequency at least half the system clock frequency and has a first and second phase. A receive clock is generated using a third clock generator means and is operated at the same frequency as the forwarded clock. In one embodiment the receive clock will be delayed compared to the system clock, where the delay in one embodiment will be less than one period of the system clock. A transmission means is then used to transmit data and the forwarded clock to a receive means. After a period of time, the transmit data arrives at the receive means. In one embodiment the period of time for the transmit data to arrive will be greater than one period of the system clock, thereby having a multiple-clock path. Once the transmit data arrives, the receive means will pass the transmitted data and forwarded clock to a synchronization means. The synchronization means synchronizes the transmitted data to the system clock using the forwarded clock and the receive clock. Finally, a capture means will capture the transmit data after it is synchronization using the system clock.

In one embodiment of the present invention, the system clock 114 or 504 may be any type of clock. Types of clocks are known to one of skill in the art. In another embodiment, the system clock 114 or 504 are standard clocks with equal and alternating segments of high and low values. In yet another embodiment, the system clock 114 or 504 are pulsed clocks, where there is a short pulse of the clock for each period of the clock.

Thus, the present invention provides a system and method for efficient high speed, high bandwidth, digital communication where transmit distances are greater than a single clock period. The system and method operate utilizing a synchronized design that takes advantage of a forwarded clock and pairs of memory devices to quickly latch data into a receiving circuit without violating timing constraints. A multiplexor is used to allow the data to be available almost immediately for processing in the receiving circuit without any corruption of data, even when operating at very high speeds. Additionally, the system, since it uses a minimum amount of circuitry, avoids complexity while reducing the latency of transmitted data.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is intended that this invention be limited only by the claims and the equivalents thereof.

What is claimed is:

1. A system for synchronous communication comprising:
   a system clock;
   a capture clock having a first and second phase, wherein the capture clock operates at a frequency at least two times slower than the system clock;
   a synchronizing clock, wherein the synchronizing clock operates at the same frequency as the capture clock; and
   a first and a second module, wherein the first module comprises:
      one or more data output nodes for transmitting data; and
      a clock output node for transmitting the capture clock signal;
   and wherein the second module comprises:
      a plurality of data input nodes for receiving data transmitted by the data output nodes of the first module;
      a capture clock input node for receiving the capture clock from the clock output node of the first module; and
      a receive circuit for synchronizing the data with the system clock,
   wherein the receive circuit comprises:
      a first memory device connected to a first data input node and operating on the first phase of the capture clock;
      a second memory device connected to the first data input node and operating on the second phase of the capture clock; and
      a multiplexor connected to the first and second memory devices, wherein the multiplexor selects between the first and second memory devices as a function of the synchronizing clock.

2. The system of claim 1, wherein the synchronizing clock is delayed with respect to the system clock.

3. The system of claim 2, wherein the delay is less than one period of the system clock.

4. The system of claim 1, wherein the first memory devices are selected from the group consisting of positive triggered D latches and positive edge triggered D flip-flops; and wherein the second memory devices are selected from the group consisting of negative triggered D latches and negative edge triggered D flip-flops.

5. The system of claim 1, wherein the distance between the first and second modules is such that it takes greater than one period of the system clock for information to travel from the first module to the second module.

6. The system of claim 1, wherein the synchronizing clock and system clock are generated external to the first and second modules.

7. The system of claim 1, wherein the synchronizing clock is generated in the first and second modules.

8. The system of claim 1, wherein the first module further comprises:
   an internal system clock having a frequency different from the system clock; and
   wherein the second module further comprises:
      an internal system clock having a frequency equal to the internal system clock of the first module.

9. The system of claim 8, wherein the internal system clocks of both the first and second modules operate at a frequency double that of the system clock.

10. An integrated circuit for synchronous communication comprising:
    a system clock;
    a capture clock having a first and second phase, wherein the capture clock operates at a frequency at least two times slower than the system clock;
    a synchronizing clock, wherein the synchronizing clock operates at the same frequency as the capture clock;
    a transmit subcircuit comprising:
       at least one transmit memory device, each transmit memory device having an output node; and
       a clock output for transmitting the capture clock;
    a receive subcircuit comprising:
       at least one first memory device, each first memory device having a data input node, a data output node and a clock input node, each data input node connected to a corresponding output node of the transmit circuit and the clock input node connected to the capture clock, wherein each first memory device operates on the first phase of the capture clock;
       at least one second memory device, each second memory device having a data input node, a data output node and a clock input node, each data input node connected to an output node of the transmit circuit and the clock input node connected to the capture clock, wherein each second memory device operates on the second phase of the capture clock;
       at least one multiplexor, each multiplexor having a first input node, a second input node, an output select node, and an output node, each first input node connected to a data output node of one of the at least one first memory devices, each second input node connected to a data output node of one of the at least one second memory devices and each output select node connected to the synchronizing clock; and
    at least one input memory device, each input memory device having an input node connected to the output node of one of the at least one multiplexors, a clock input node connected to the system clock and an output node.

11. The integrate circuit of claim 10, wherein the synchronizing clock is delayed with respect to the system clock.

12. The integrated circuit of claim 11, wherein the delay is less than one period of the system clock.

13. The integrated circuit of claim 10, wherein the at least one first memory device and the at least one input memory device are selected from the group consisting of positive triggered D latches and positive edge triggered D flip-flops, and the at least one second memory device is selected from the group consisting of negative triggered D latches and negative edge triggered D flip-flops.

14. The integrated circuit of claim 10, wherein the distance between the transmit subcircuit and receive subcircuit is such that it takes greater than one period of the system clock for information to travel from the transmit subcircuit to the receive subcircuit.

15. In a system operating at a first clock frequency a method of high speed synchronous communication comprising:

provviding a receive module having a first and second memory device;

generating a forwarded clock, wherein the forwarded clock operates at a frequency at least half the first clock frequency and has first and second phases;

generating a receive clock at a frequency equal to the forwarded clock frequency;

transmitting data and the forwarded clock from a transmit module;

storing the data into the receive module, wherein storing includes storing data into the first memory device on the first phase of the forwarded clock and into the second memory device on the second phase of the forwarded clock;

synchronizing the data into the receive module using the receive clock; and capturing the data in the receive module for further processing using the first clock.

16. The method of claim 15, wherein the receive clock is delayed with respect to the first clock.

17. The method of claim 16, wherein the delay is less than one period of the first clock.

18. The method of claim 15, wherein the first memory device is selected from the group consisting of positive triggered D latches and positive edge triggered D flip-flops, and the second memory device is selected from the group consisting of negative triggered D latches and negative edge triggered D flip-flops.

19. The method of claim 15, wherein the time from transmitting the data to storing the data takes greater than one period of the first clock.

* * * * *